(12) United States Patent
Cheng et al.

(10) Patent No.: US 11,215,475 B2
(45) Date of Patent: Jan. 4, 2022

(54) EXPERIMENTAL CALIBRATION METHOD FOR REDUNDANT INERTIAL MEASUREMENT UNIT

(71) Applicant: Harbin Engineering University, Heilongjiang (CN)

(72) Inventors: Jianhua Cheng, Heilongjiang (CN); Ping Liu, Heilongjiang (CN); Guangdi Luo, Heilongjiang (CN); Li Yang, Heilongjiang (CN); Xiangyu Sun, Heilongjiang (CN); Wenhuan Fu, Heilongjiang (CN); Mingtao Dong, Heilongjiang (CN); Ping Dong, Heilongjiang (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 0 days.

(21) Appl. No.: 17/013,741

(22) Filed: Sep. 7, 2020

(65) Prior Publication Data
US 2021/0095993 A1 Apr. 1, 2021

(30) Foreign Application Priority Data
Sep. 29, 2019 (CN) .......................... 201910934423.3

(51) Int. Cl.
*G01C 25/00* (2006.01)
*G01C 19/5776* (2012.01)

(52) U.S. Cl.
CPC ......... *G01C 25/00* (2013.01); *G01C 19/5776* (2013.01); *G01C 25/005* (2013.01)

(58) Field of Classification Search
USPC ......................................................... 702/96
See application file for complete search history.

(56) References Cited

U.S. PATENT DOCUMENTS

| 8,762,091 B1* | 6/2014 | Foxlin | G01C 25/00 |
| | | | 702/87 |
| 2012/0203487 A1* | 8/2012 | Johnson | G01C 25/005 |
| | | | 702/104 |
| 2018/0136009 A1* | 5/2018 | Tian | G01C 17/38 |

\* cited by examiner

*Primary Examiner* — Paul D Lee
(74) *Attorney, Agent, or Firm* — Dragon Sun Law Firm, PC; Jinggao Li, Esq.

(57) ABSTRACT

The disclosure provides an experimental calibration method of a redundant inertial measurement unit including, step (1), establishing an installation angle model using a cone descriptive scheme, and obtaining a relationship of an angular speed of a carrier and an angular speed measured by each gyroscope, step (2), establishing a standard calibration model of the redundant inertial measurement unit based on a relationship between a sensor coordinate system and a carrier coordinate system, step (3), establishing a state equation and a measurement equation of a filter, step (4), performing a row amplification of measurement amounts based on the measurement equation established in step (3), and obtaining an amplificated measurement equation for improving observability, and step (5), obtaining a Jacobi matrix and a Hessian matrix based on the amplificated measurement equation, and estimating error parameters by an extended Kalman filtering algorithm based on a second-order Taylor expansion.

5 Claims, 21 Drawing Sheets

EXPERIMENTAL CALIBRATION METHOD FOR REDUNDANT INERTIAL MEASUREMENT UNIT

CROSS-REFERENCE TO RELATED PATENT APPLICATION

This application claims priority to and the benefit of 201910934423.3, filed Sep. 29, 2019. The entire disclosure of the above-identified application is incorporated herein by reference.

FIELD

The present disclosure relates to a calibration method used in a strapdown inertial navigation system, and specifically to an experimental calibration method for a redundant inertial measurement unit.

BACKGROUND

Since the strapdown inertial navigation system has a strong autonomy and a good invisibility et cetera, the strapdown inertial navigation system is widely used in the vehicles such as the vessels, planes and automobiles to provide the navigation information such as the posture, velocity and position. The reliability of the strapdown inertial navigation system will directly influence the work state of the vehicles, and thus the malfunctions of the navigation system may result in the invalidity or serious accidents of the vehicles. With the development of technology, the requirements to the reliability of the navigation system are increasing. Many situations require that the navigation system must be applicable to the high-dynamic, high-overload or large-impact environments. The reliability and long-endurance accuracy of the navigation system are important expressions on its performance. Therefore, the improvement of reliability of the inertial navigation system is an important aspect in the inertial navigation field. The application of the redundant fault-tolerant technique is the main direction for improving the reliability of the inertial navigation system. Due to the performance of the inertia devices and the limitation of the installation condition, even if the inertial navigation system uses the redundant fault-tolerant technique, the errors such as a scale factor, installation error and constant drift may be existed in the system. Comparing with the traditional triaxial orthogonal inertial navigation system, the number of the devices increases and the installation way of the sensors is not orthogonal in the redundant inertial navigation system. The output data of the sensors are of the coupling characteristic, and thus the conventional constant error model cannot be used. However, in the 12-error calibration model of the common four redundant strapdown inertial navigation system, the parameters are too much and the calibration method is very complex. Therefore, the design of a reasonable calibration method to reduce the constant error of the inertial navigation system is a key for improving the accuracy of the navigation information.

There are many experimental calibration methods for the inertial measurement unit. In these experimental calibration methods, the multi-position calibration method is based on a high accuracy turntable. A carrier is placed on the high-accuracy turntable, and the turntable is set to be rotated in a uniform speed at many different positions. Syed and his co-authors proposed a multi-position calibration method that can estimate the zero deflection, scale factor and installation error in the paper titled "A new multi-position calibration method for MEMS inertial navigation systems" (published in "Measurement Science and Technology", Issue 18, 2007). The multi-position calibration method can be realized and can be used extensively. However, the method only can be suitable to the calibration of the traditional triaxial inertial measurement unit, and cannot calibrate the rotation angular speed of the earth with respect to the low-accuracy inertial measurement unit. Wanke LIU and his co-authors gave a uniform speed calibration scheme based on a high accuracy turntable in the paper titled "iIMU-FSAS fiber gyroscope calibration based on uniform speed 26-position method" (Issue 01, 2017). The scheme is suitable to the calibration of the low-accuracy inertial measurement unit, but cannot be used in a redundant system. Mark suggested a calibration method of a redundant inertial measurement unit in the paper titled "Calibration and Attitude Determination with Redundant Inertial Measurement Units" (published in "Journal of Guidance, Control, and Dynamics", Issue 04, 2005). The method cannot be modeled accurately and thus the calibration accuracy is low.

SUMMARY

The present disclosure provides an experimental calibration method for a redundant inertial measurement unit to improve the accuracy of the navigation information.

The objective of the present disclosure is achieved by the following way.

An experimental calibration method of a redundant inertial measurement unit comprising the following step.

Step (1): establishing an installation angle model using a cone descriptive scheme, and obtaining a relationship of an angular speed of a carrier and an angular speed measured by each gyroscope.

Step (2): establishing a standard calibration model of the redundant inertial measurement unit based on a relationship between a sensor coordinate system and a carrier coordinate system.

Step (3): establishing a state equation and a measurement equation of a filter.

Step (4): performing a row amplification of measurement amounts based on the measurement equation established in step (3), and obtaining an amplificated measurement equation for improving observability.

Step (5): obtaining a Jacobi matrix and a Hessian matrix based on the amplificated measurement equation, and estimating error parameters by an extended Kalman filtering algorithm based on a second-order Taylor expansion, to obtain a precise zero deflection, scale factor error and installation error of sensors.

The present disclosure further provides the following features.

The step (1) comprises the following details.

Using an intersection angle between a sensitive axis of the gyroscope and a Z axis of the carrier coordinate system as a first installation angle $\alpha$, using an intersection angle between a projection the sensitive axis on a xoy plane of the carrier coordinate system and a X axis of the carrier coordinate system as a second installation angle $\beta$, and establishing the relationship between the angular speed of the carrier and the angular speed measured by each gyroscope based on a relationship between the carrier coordinate system and the sensitive axis of the gyroscope.

$$\begin{bmatrix} \omega_{g1} \\ \cdots \\ \omega_{gn} \end{bmatrix} = \begin{bmatrix} \sin\alpha_1\cos\beta_1 & \sin\alpha_1\sin\beta_1 & \cos\alpha_1 \\ \cdots & \cdots & \cdots \\ \sin\alpha_n\cos\beta_n & \sin\alpha_n\sin\beta_n & \cos\alpha_n \end{bmatrix} \cdot \begin{bmatrix} \omega_{bx} \\ \omega_{by} \\ \omega_{bz} \end{bmatrix}$$

Where $\omega_{gm}$ is the angular speed outputted by the $n^{th}$ gyroscope, and $\omega_{bx}$, $\omega_{by}$, $\omega_{bz}$ are the angular speed in the carrier coordinate system.

The standard calibration model of the redundant inertial measurement unit is as follows.

$$\omega_{gn} = (1-k_n)\left(w_n\begin{bmatrix}\omega_{xb}\\\omega_{yb}\\\omega_{zb}\end{bmatrix} - \delta\beta_n u_n\begin{bmatrix}\omega_{xb}\\\omega_{yb}\\\omega_{zb}\end{bmatrix} - \delta\alpha_n v_n\begin{bmatrix}\omega_{xb}\\\omega_{yb}\\\omega_{zb}\end{bmatrix}\right) - b_n$$

Where $b_n$ is the zero deflection of the $n^{th}$ sensor, $k_n$, is the scale factor error of the $n^{th}$ sensor, $\delta\alpha_n$ is the error of the first installation angle $\alpha$ of the $n^{th}$ sensor, $\delta\beta_n$ is the error of the second installation angle $\beta$ of the $n^{th}$ sensor, and $w_n$, $u_n$ and $v_n$, are installation relationship matrixes of the sensors in the carrier coordinate system.

The installation relationship matrixes of the sensors in the carrier coordinate system are expressed as follows.

$w_n=[\cos\beta_n\sin\alpha_n\ \sin\beta_n\sin\alpha_n\ \cos\alpha_n]$ $u_n=[\cos\beta_n\sin(\alpha_n+90°)\sin\beta_n\sin(\alpha_n+90°)\cos(\alpha_n+90°)]$ $v_n=[\cos(\beta_n+90°)\sin(\beta_n+90°)0]$ The state equation is expressed as follows.

$X_{k+1}=X_k$.

Where $X=[b_1 \ldots b_n\ k_1 \ldots k_n\ \delta\alpha_1 \ldots \delta\alpha_n\ \delta\beta_1 \ldots \delta\beta_n]^T$ and X is the state amounts of the filter.

The measurement equation is expressed as $z_k=H_{inv}(\delta\beta U\omega_L+\delta\alpha V\omega_t+KW\omega_t-K\delta\alpha V\omega_t-K\delta\beta U\omega_t+B)$.

Where $z_k=\omega_t-H_{inv}\omega_G$, and $z_k$ is the measurement amounts of the filter.

The amplificated measurement equation is as follows.

$$\begin{cases}\omega_t - H_{inv}\omega_G = H_{inv}(\delta\beta U\omega_t + \delta\alpha V\omega_t + KW\omega_t - K\delta\alpha V\omega_t - K\delta\beta U\omega_t + B) \\ -N^T\omega_G = N^T(\delta\beta U\omega_t + \delta\alpha V\omega_t + KW\omega_t - K\delta\alpha V\omega_t - K\delta\beta U\omega_t + B)\end{cases}$$

Where $H_{inv}$ is a generalized inverse expression of H obtained based on a least square method, and N is an amplification matrix.

The generalized inverse expression of H is as follows.

$H_{inv}=(H^TH)^{-1}H^T$.

The expression of the amplification matrix is as follows.

$$\begin{cases} N^TH = 0 \\ N^TN = I. \end{cases}$$

The Jacobi matrix is as follows.

$$J_k = \begin{bmatrix} H_{inv} & H_{inv}(W\omega_t - \delta\alpha V\omega_t - \delta\beta U\omega_t) & H_{inv}(V\omega_t - Kv\omega_t) & H_{inv}(U\omega_t - KV\omega_t) \\ N^T & N^T(W\omega_t - \delta\alpha V\omega_t - \delta\beta U\omega_t) & N^T(V\omega_t - KV\omega_t) & N^T(U\omega_t - KV\omega_t) \end{bmatrix}.$$

The Hessian matrix is as follows.

$C_{BB} = C_{BK} = C_{B\delta\alpha} = C_{B\delta\beta} =$ $C_{KB} = C_{KK} = C_{\delta\alpha B} = C_{\delta\alpha\delta\alpha} = C_{\delta\alpha\delta\beta} = C_{\delta\alpha\beta B} = C_{\delta\beta\delta\alpha} = C_{\delta\beta\delta\beta} = 0$ $C_{K\theta_x} = \begin{bmatrix} -H_{inv}V\omega_t \\ -N^TV\omega_t \end{bmatrix}$ $C_{K\delta\beta} = \begin{bmatrix} -H_{inv}U\omega_t \\ -N^TU\omega_t \end{bmatrix}$ $C_{\theta_xK} = \begin{bmatrix} -H_{inv}V\omega_t \\ -N^TV\omega_t \end{bmatrix}$ $C_{\delta\beta K} = \begin{bmatrix} -H_{inv}U\omega_t \\ -N^TU\omega_t \end{bmatrix}$, Where $g_k=H_kX_k$, $g_k = H_kX_k,\ C_{BB}=\frac{\partial^2 g_k}{\partial B^2},\ C_{BK}=\frac{\partial^2 g_k}{\partial B\partial K},\ C_{B\delta\alpha}=\frac{\partial^2 g_k}{\partial B\partial\delta\alpha},\ C_{B\delta\beta}=\frac{\partial^2 g_k}{\partial B\partial\delta\beta},$ $C_{KB}=\frac{\partial^2 g_k}{\partial K\partial B},\ C_{KK}=\frac{\partial^2 g_k}{\partial K^2},\ C_{K\delta\alpha}=\frac{\partial^2 g_k}{\partial K\partial\delta\alpha},\ C_{K\delta\beta}=\frac{\partial^2 g_k}{\partial K\partial\delta\beta},$ $C_{\delta\alpha B}=\frac{\partial^2 g_k}{\partial\delta\alpha\partial B},\ C_{\delta\alpha K}=\frac{\partial^2 g_k}{\partial\delta\alpha\partial K},\ C_{\delta\alpha\delta\alpha}=\frac{\partial^2 g_k}{\partial\delta\alpha\partial\delta\alpha},\ C_{\delta\alpha\delta\beta}=\frac{\partial^2 g_k}{\partial\delta\alpha\partial\delta\beta},$ $C_{\delta\beta B}=\frac{\partial^2 g_k}{\partial\delta\beta\partial B},\ C_{\delta\beta K}=\frac{\partial^2 g_k}{\partial\delta\beta\partial K},\ C_{\delta\beta\delta\alpha}=\frac{\partial^2 g_k}{\partial\delta\beta\partial\delta\alpha},\ C_{\delta\beta\delta\beta}=\frac{\partial^2 g_k}{\partial\delta\beta\partial\delta\beta}.$ Compared with the prior art, the advantages of the disclosure are as follows.

The present disclosure discloses an experimental calibration method of a redundant inertial measurement unit. The method presents the cone descriptive scheme of the installation angle error. Based on the cone descriptive scheme, the installation error model of the inertial measurement unit can be established. After bringing the zero deflection and scale factor into the installation error model, the universal calibration model of the redundant inertial measurement unit can be derived. The state equation and measurement equation of the filter can be established based on the calibration model. The observability of the measurement equation can be increased by the zero space amplification. Finally, the zero deflection, scale factor error and installation error can be estimated by extended Kalman filtering algorithm based on the two-order Taylor expansion. The method can provide a high estimated accuracy, a strong universality, and a simple experimentation process. In addition, the method can estimate the zero deflection, the scale factor error and installation error at the same time, and can improve the accuracy of the inertial measurement unit.

The present disclosure provides an experimental calibration apparatus of a redundant inertial measurement unit, comprising, a relationship obtaining component for obtaining a relationship of an angular speed of a carrier and an angular speed measured by each gyroscope, based on an installation angle model established using a cone descriptive scheme, a model establishing a component for establishing a standard calibration model of the redundant inertial measurement based on a relationship between a sensor coordinate system and a carrier coordinate system, an equation establishing component for establishing a state equation and a measurement equation of a filter, an amplifying component for performing a row amplification of measurement amounts based on the measurement equation, and obtaining an amplificated measurement equation for improving observability, and a matrix obtaining component for obtaining a Jacobi matrix and a Hessian matrix based on the amplificated measurement equation, and estimating error parameters by an extended Kalman filtering algorithm based on a second-order Taylor expansion, to obtain a precise zero deflection, scale factor error and installation error of sensors.

DETAILED DESCRIPTION

Figure 1:
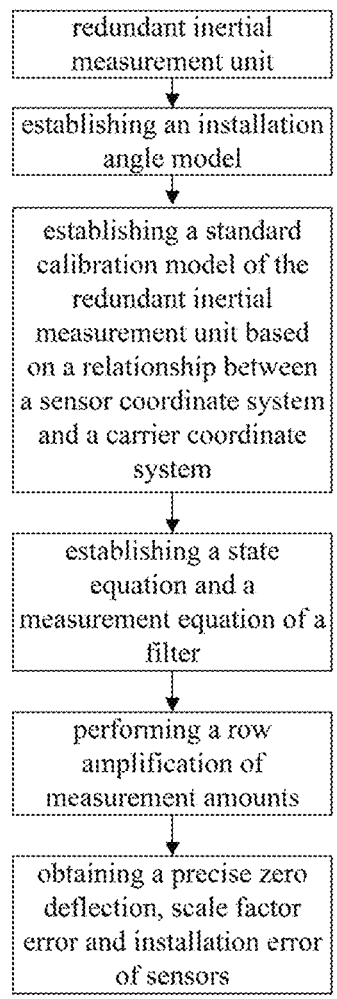
FIG. 1 is a flow diagram of the experimental calibration method of the redundant inertial measurement unit of the present disclosure.

The specific embodiments of the present disclosure will be further described below with reference to the drawings.

The objective of the present disclosure is to provide an experimental calibration method of a redundant inertial measurement unit.

To realize the objective as mentioned above, the method of the disclosure includes the following steps.

(1) Establishing an installation angle model using a cone descriptive scheme, and obtaining a relationship of an angular speed of a carrier and an angular speed measured by each gyroscope.

(2) Establishing a standard calibration model of the redundant inertial measurement unit based on a relationship between a sensor coordinate system and a carrier coordinate system.

(3) Establishing a state equation and a measurement equation of a filter.

(4) Performing a row amplification of measurement amounts based on the measurement equation established in Step (3), and obtaining the amplificated measurement equation for improving observability.

(5) Obtaining a Jacobi matrix and a Hessian matrix based on the amplificated measurement equation, and estimating error parameters by an extended Kalman filtering algorithm of second-order Taylor expansion, to obtain a precise zero deflection, scale factor error and installation error of sensors.

The step of establishing an installation angle model using a cone descriptive scheme, and obtaining a relationship of an angular speed of a carrier and an angular speed measured by each gyroscope, includes the following details.

An intersection angle between a sensitive axis of the gyroscope and Z axis of the carrier coordinate system is used as a first installation angle, and an intersection angle between a projection and X axis of the carrier coordinate system is used as a second installation angle. The projection is that the sensitive axis of the gyroscope is projected on xoy plane of the carrier coordinate system. Based on the relationship between the carrier coordinate system and the sensitive axis of the gyroscope, the relationship between the angular speed of the carrier and the angular speed measured by each gyroscope is formed.

$$\begin{bmatrix} \omega_{g1} \\ \ldots \\ \omega_{gn} \end{bmatrix} = \begin{bmatrix} \sin \alpha_1 \cos \beta_1 & \sin \alpha_1 \sin \beta_1 & \cos \alpha_1 \\ \ldots & \ldots & \ldots \\ \sin \alpha_n \cos \beta_n & \sin \alpha_n \sin \beta_n & \cos \alpha_n \end{bmatrix} \cdot \begin{bmatrix} \omega_{bx} \\ \omega_{by} \\ \omega_{bz} \end{bmatrix}.$$

Where, $\omega_{gn}$ is an angular speed outputted by the $n^{th}$ gyroscope, and $\omega_{bx}$, $\omega_{by}$, $\omega_{bz}$ are the angular speed in the carrier coordinate system.

The standard calibration model of the inertial measurement unit is as follows.

$$\omega_{gn} = (1 - k_n)\left(w_n \begin{bmatrix} \omega_{xb} \\ \omega_{yb} \\ \omega_{zb} \end{bmatrix} - \delta\beta_n u_n \begin{bmatrix} \omega_{xb} \\ \omega_{yb} \\ \omega_{zb} \end{bmatrix} - \delta\alpha_n v_n \begin{bmatrix} \omega_{xb} \\ \omega_{yb} \\ \omega_{zb} \end{bmatrix}\right) - b_n.$$

Where $b_n$ is the zero deflection of the $n^{th}$ sensor, $k_n$ is the scale factor error of the $n^{th}$ sensor, $\delta\alpha_n$ is the error of the first installation angle α of the $n^{th}$ sensor, $\delta\beta_n$ is the error of the second installation angle β of the $n^{th}$ sensor, and $w_n$, $u_n$ and $v_n$ are installation relationship matrixes of the sensors in the carrier coordinate system.

The installation relation matrix of sensors in the carrier coordinate system is expressed as:

$w_n = [\cos \beta_n \sin \alpha_n \ \sin \beta_n \sin \alpha_n \ \cos \alpha_n]$ $u_n = [\cos \beta_n \sin(\alpha_n + 90°) \sin \beta_n \sin(\alpha_n + 90°) \cos(\alpha_n + 90°)]$ $v_n = [\cos(\beta_n + 90°) \sin(\beta_n + 90°) 0]$ The state equation of the filter is as follows.

$X_{k+1} = X_k$.

Where $X=[b_1 \ldots b_n \, k_1 \ldots k_n \, \delta\alpha_1 \ldots \delta\alpha_n \, \delta\beta_1 \ldots \delta\beta_n]^T$ and X is the state amounts of the filter.

The measurement equation can be expressed as follows.

$$z_k = H_{inv}(\delta\beta U\omega_t + \delta\alpha V\omega_t + KW\omega_t - K\delta\alpha V\omega_t - K\delta\beta U\omega_t + B).$$

Where $z_k = \omega_t - H_{inv}\omega_G$, and $z_k$ is the measurement amounts of the filter.

The row amplificated state equation is shown as follows.

$$\begin{cases} \omega_t - H_{inv}\omega_G = H_{inv}(\delta\beta U\omega_t + \delta\alpha V\omega_t + KW\omega_t - K\delta\alpha V\omega_t - K\delta\beta U\omega_t + B) \\ -N^T\omega_G = N^T(\delta\beta U\omega_t + \delta\alpha V\omega_t + KW\omega_t - K\delta\alpha V\omega_t - K\delta\beta U\omega_t + B) \end{cases}$$

Where $H_{inv}$ is a generalized inverse expression of H obtained based on a least square method, and N is an amplification matrix.

The generalized inverse expression of H obtained from the least square method is as follows.

$$H_{inv} = (H^T H)^{-1} H^T.$$

The expression of the amplification matrix is as follows.

$$\begin{cases} N^T H = 0 \\ N^T N = 1. \end{cases}$$

The Jacobi matrix is:

$$J_k = \begin{bmatrix} H_{inv} & H_{inv}(W\omega_t - \delta\alpha V\omega_t - \delta\beta U\omega_t) & H_{inv}(V\omega_t - Kv\omega_t) & H_{inv}(U\omega_t - KV\omega_t) \\ N^T & N^T(W\omega_t - \delta\alpha V\omega_t - \delta\beta U\omega_t) & N^T(V\omega_t - KV\omega_t) & N^T(U\omega_t - KV\omega_t) \end{bmatrix}$$

The Hessian matrix is:

$$C_{BB} = C_{BK} = C_{B\delta\alpha} = C_{B\delta\beta} =$$
$$C_{KB} = C_{KK} = C_{\delta\alpha B} = C_{\delta\alpha\delta\alpha} = C_{\delta\alpha\delta\beta} = C_{\delta\alpha\beta} = C_{\delta\beta\delta\alpha} = C_{\delta\beta\delta\beta} = 0$$

$$C_{K\theta_x} = \begin{bmatrix} -H_{inv}V\omega_t \\ -N^T V\omega_t \end{bmatrix}$$

$$C_{K\delta\beta} = \begin{bmatrix} -H_{inv}U\omega_t \\ -N^T U\omega_t \end{bmatrix}$$

$$C_{\theta_x K} = \begin{bmatrix} -H_{inv}V\omega_t \\ -N^T V\omega_t \end{bmatrix}$$

$$C_{\delta\beta K} = \begin{bmatrix} -H_{inv}U\omega_t \\ -N^T U\omega_t \end{bmatrix}$$

Where $g_k = H_k X_k$, $$g_k = H_k X_k, \; C_{BB} = \frac{\partial^2 g_k}{\partial B^2}, \; C_{BK} = \frac{\partial^2 g_k}{\partial B \partial K}, \; C_{B\delta\alpha} = \frac{\partial^2 g_k}{\partial B \partial \delta\alpha}, \; C_{B\delta\beta} = \frac{\partial^2 g_k}{\partial B \partial \delta\beta},$$

$$C_{KB} = \frac{\partial^2 g_k}{\partial K \partial B}, \; C_{KK} = \frac{\partial^2 g_k}{\partial K^2}, \; C_{K\delta\alpha} = \frac{\partial^2 g_k}{\partial K \partial \delta\alpha}, \; C_{K\delta\beta} = \frac{\partial^2 g_k}{\partial K \partial \delta\beta},$$

$$C_{\delta\alpha B} = \frac{\partial^2 g_k}{\partial \delta\alpha \partial B}, \; C_{\delta\alpha K} = \frac{\partial^2 g_k}{\partial \delta\alpha \partial K}, \; C_{\delta\alpha\delta\alpha} = \frac{\partial^2 g_k}{\partial \delta\alpha \partial \delta\alpha}, \; C_{\delta\alpha\delta\beta} = \frac{\partial^2 g_k}{\partial \delta\alpha \partial \delta\beta},$$

$$C_{\delta\beta B} = \frac{\partial^2 g_k}{\partial \delta\beta \partial B}, \; C_{\delta\beta K} = \frac{\partial^2 g_k}{\partial \delta\beta \partial K}, \; C_{\delta\beta\delta\alpha} = \frac{\partial^2 g_k}{\partial \delta\beta \partial \delta\alpha}, \; C_{\delta\beta\delta\beta} = \frac{\partial^2 g_k}{\partial \delta\beta \partial \delta\beta}.$$

Based on the way, the experimental calibration of the redundant inertial measurement unit is completed. The estimated zero deflection, scale factor error and installation error are brought into the inertial measurement unit, and the precise angular speed output can be obtained.

The present disclosure provides an experimental calibration method of the redundant inertial measurement unit. The flow diagram is shown as FIG. 1. The method comprises the following steps.

Figure 2:
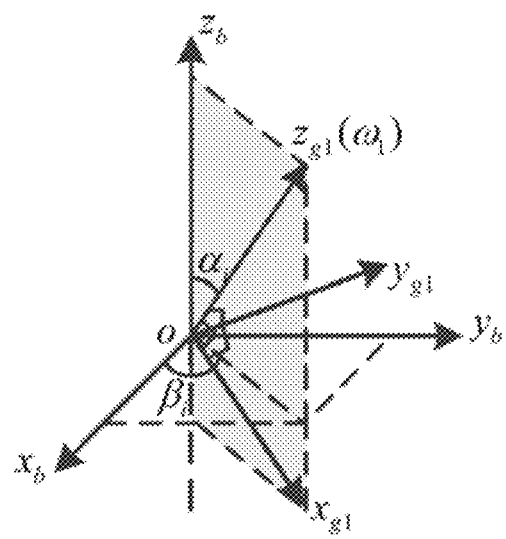
FIG. 2 is a schematic drawing showing the relationship between the sensing coordinate system and the carrier coordinate system.

(1) Using the redundant inertial measurement unit configured in a tetrahedron redundant way of four gyroscopes as an object, the pair of the gyroscope and accelerometer is placed on each surface of the tetrahedron. Taking the gyroscope as an example in this experiment, the configuration way is shown as FIG. 2. The data of the gyroscopes of this system are collected.

The configuration way is as follows.

The gyroscope 1 is installed along the $z_b$ axis of the carrier coordinate system. The gyroscopes 2, 3, 4 have the intersection angle α of 70.53° with respect to $z_b$ axis, and are installed on the three side surfaces of the tetrahedron. The intersection angle $\beta_2$ of the $x_b o y_b$-plane projection of the measurement axis of the gyroscope 2 and the $ox_b$ axis is 0°. The intersection angle $\beta_3$ of the xboyb-plane projection of the measurement axis of the gyroscope 3 and the $ox_b$ axis is 120°. The intersection angle $\beta_4$ of the $x_b o y_b$-plane projection of the measurement axis of the gyroscope 3 and the $ox_b$ axis is 240°.

By the configuration way, the configuration matrix H of the four-gyroscope redundant inertial measurement unit is as follows.

$$H = \begin{bmatrix} 0 & 0 & 1 \\ 0.8165 & 0.4714 & -0.3333 \\ -0.8165 & 0.4714 & -0.3333 \\ 0 & -0.9428 & -0.3333 \end{bmatrix}.$$

The relationship between the angular speed of the carrier and the angular speed measured by each gyroscope is as follows.

$$\begin{bmatrix} \omega_{g1} \\ \cdots \\ \omega_{g4} \end{bmatrix} = H \cdot \begin{bmatrix} \omega_{xb} \\ \omega_{yb} \\ \omega_{zb} \end{bmatrix}$$

(2) Establishing the sensor coordinate system $ox_g y_g z_g$, wherein the sensitive axis of the sensor is used as the $z_g$ axis of the sensor coordinate system, the $x_g$ axis is on the $z_g o z_b$ plane and perpendicular to the $z_g$ axis, and the $y_g$ axis, $x_g$ axis and $z_g$ axis form right hand Cartesian coordinate system. The sensor coordinate system and its relationship with the carrier coordinate system are shown as FIG. 2. Therefore, the relationship of the two coordinate systems can be obtained as follows.

$$x_{gi}=[\cos \beta_i \sin(\alpha_i+90°)\sin \beta_i \sin(\alpha_i+90°)\cos(\alpha_i+90°)][x_b y_b z_b]^T$$

$$=\alpha_i[x_b y_b z_b]^T$$

$$y_{gi}=[\cos(\beta_i+90°)\sin(\beta_i+90°)0]\cdot[x_b y_b z_b]^T=v_i[x_b y_b z_b]^T$$

$$z_{gi}=[\cos \beta_i \sin \alpha_i \sin \beta_i \sin \alpha_i \cos \alpha_i]\cdot[x_b y_b z_b]^T=w_i[x_b y_b z_b]^T$$

Where i is the numbering of the gyroscopes.

When there is the installation error which may be equivalent to the two-time small angular rotation of the sensor coordinate system around the $x_g$ axis and the $y_g$ axis, the rotation angles are set as $\delta\alpha$ and $\delta\beta$ respectively, and the relationship between the rotated sensor coordinate system $ox'_g y'_g z'_g$ and the sensor coordinate system $ox_g y_g z_g$ can be obtained based on the small-angle rotation equation of the coordinate system.

$$\begin{bmatrix} x'_g \\ y'_g \\ z'_g \end{bmatrix} = \begin{bmatrix} 1 & 0 & \delta\beta \\ 0 & 1 & \delta\alpha \\ -\delta\beta & -\delta\alpha & 1 \end{bmatrix} \begin{bmatrix} x_g \\ y_g \\ z_g \end{bmatrix}$$

Since the sensitive axis of the gyroscope and the $z_g$ axis of the sensor coordinate system, the angular speed output of the gyroscope is as follows when there is the installation error.

$$\omega_g = w\begin{bmatrix} \omega_{xb} \\ \omega_{yb} \\ \omega_{zb} \end{bmatrix} - \delta\beta \cdot u\begin{bmatrix} \omega_{xb} \\ \omega_{yb} \\ \omega_{zb} \end{bmatrix} - \delta\alpha \cdot v\begin{bmatrix} \omega_{xb} \\ \omega_{yb} \\ \omega_{zb} \end{bmatrix}$$

Wherein, $\omega_{xb}$, $\omega_{yb}$ and $\omega_{zb}$ are the angular speeds of the triaxial carrier coordinate system provided by the high accuracy turntable.

(3) Bring the zero deflection and the scale factor error of the gyroscope into the equation of the angular speed output in Step (2), the calibration model of the inertial measurement unit can be expressed as follows.

$$\omega_{gi} = (1-k_i)\left(w_i\begin{bmatrix} \omega_{xb} \\ \omega_{yb} \\ \omega_{zb} \end{bmatrix} - \delta\beta u_i\begin{bmatrix} \omega_{xb} \\ \omega_{yb} \\ \omega_{zb} \end{bmatrix} - \delta\alpha v_i\begin{bmatrix} \omega_{xb} \\ \omega_{yb} \\ \omega_{zb} \end{bmatrix}\right) - b_i$$

Wherein, i is the numbering of the gyroscopes.

In the four-gyroscope inertial measurement unit, the model can be expressed by a matrix way. The expression is as follows.

$$\omega_G = (I-B)(W\omega_t - \delta\beta U\omega_t - \delta\alpha V\omega_t) - B$$

Where $\omega_G=[\omega_{g1} \ldots \omega_{g4}]^T$, $\omega_t=[\omega_x \ \omega_y \ \omega_z]^T$, $W=H=[w_1 \ldots w_4]^T$, $U=[u_1 \ldots u_4]^T$, $V=[v_1 \ldots v_4]^T$, $\delta\beta=\text{diag}([\delta\beta_1 \ldots \delta\beta_4])$, $\delta\alpha=\text{diag}([\delta\alpha_1 \ldots \delta\alpha_n])$.

(4) Based on the calibration model established in Step (3), establishing the state equation and the measurement equation of the filter. Since the state amount of the system is not changed with the change of the time, the state equation is thus as follows.

$$X_{k+1}=X_k.$$

Wherein, X is the state amount of the filter.

The expression of the state amount of the filter is:

$$X=[b_1 \ldots b_4 \ k_1 \ldots k_4 \ \delta\alpha_1 \ldots \delta\alpha_4 \ \delta\beta_1 \ldots \delta\beta_4]^T$$

The expression of the measurement equation is:

$$z_k = H_{inv}(\delta\beta U\omega_t + \delta\alpha V\omega_t + KW\omega_t - K\delta\alpha V\omega_t - K\delta\beta U\omega_t + B)$$

Wherein, $z_k$ is the measurement amount, and $H_{inv}$ is the generalized inverse of H obtained by the least square method.

The measurement amount $z_k$ is expressed as:

$$z_k = \omega_t - H_{inv}\omega_G$$

The generalized inverse expression of H obtained from a least square method is as follows.

$$H_{inv}=(H^T H)^{-1}H^T.$$

(5) In order to improve the observability of the system, performing the row amplification with respect to the measurement equation of the filer established in Step (4), and introducing the amplification matrix N.

The expression of the amplificated matrix is as follows.

$$\begin{cases} N^T H = 0 \\ N^T N = 1 \end{cases}.$$

The amplification matrix is brought into the measurement equation of the filter, to obtain amplificated measurement equation of the filter.

$$\begin{cases} \omega_t - H_{inv}\omega_G = H_{inv}(\delta\beta U\omega_t + \delta\alpha V\omega_t + KW\omega_t - K\delta\alpha V\omega_t - K\delta\beta U\omega_t + B) \\ -N^T \omega_G = N^T(\delta\beta U\omega_t + \delta\alpha V\omega_t + KW\omega_t - K\delta\alpha V\omega_t - K\delta\beta U\omega_t + B) \end{cases}$$

(6) Obtaining the Jacobi matrix as follows, based on the measurement equation and the state equation.

$$J_k = \begin{bmatrix} H_{inv} & H_{inv}(W\omega_t - \delta\alpha V\omega_t - \delta\beta U\omega_t) & H_{inv}(V\omega_t - KV\omega_t) & H_{inv}(U\omega_t - KV\omega_t) \\ N^T & N^T(W\omega_t - \delta\alpha V\omega_t - \delta\beta U\omega_t) & N^T(V\omega_t - KV\omega_t) & N^T(U\omega_t - KV\omega_t) \end{bmatrix}$$

Obtaining the Hessian matrix as follows.

$$C_{BB} = C_{BK} = C_{B\delta\alpha} = C_{B\delta\beta} =$$

$$C_{KB} = C_{KK} = C_{\delta\alpha B} = C_{\delta\alpha\delta\alpha} = C_{\delta\alpha\delta\beta} = C_{\delta\alpha\beta B} = C_{\delta\beta\delta\alpha} = C_{\delta\beta\delta\beta} = 0.$$

$$C_{K\theta_x} = \begin{bmatrix} -H_{inv}V\omega_t \\ -N^T V\omega_t \end{bmatrix}$$

$$C_{K\delta\beta} = \begin{bmatrix} -H_{inv}U\omega_t \\ -N^T U\omega_t \end{bmatrix}$$

$$C_{\theta_x K} = \begin{bmatrix} -H_{inv}V\omega_t \\ -N^T V\omega_t \end{bmatrix}$$

-continued $$C_{\delta\beta K} = \begin{bmatrix} -H_{inv}U\omega_t \\ -N^T U\omega_t \end{bmatrix}$$

Where $g_k = H_k X_k$, $$g_k = H_k X_k,\ C_{BB} = \frac{\partial^2 g_k}{\partial B^2},\ C_{BK} = \frac{\partial^2 g_k}{\partial B \partial K},\ C_{B\delta\alpha} = \frac{\partial^2 g_k}{\partial B \partial \delta\alpha},$$

$$C_{B\&\beta} = \frac{\partial^2 g_k}{\partial B \partial \delta\beta},\ C_{KB} = \frac{\partial^2 g_k}{\partial K \partial B},\ C_{KK} = \frac{\partial^2 g_k}{\partial K^2},\ C_{K\delta\alpha} = \frac{\partial^2 g_k}{\partial K \partial \delta\alpha},$$

$$C_{K\delta\beta} = \frac{\partial^2 g_k}{\partial K \partial \delta\beta},\ C_{\delta\alpha B} = \frac{\partial^2 g_k}{\partial \delta\alpha \partial B},\ C_{\delta\alpha K} = \frac{\partial^2 g_k}{\partial \delta\alpha \partial K},$$

$$C_{\delta\alpha\delta\alpha} = \frac{\partial^2 g_k}{\partial \delta\alpha \partial \delta\alpha},\ C_{\delta\alpha\delta\beta} = \frac{\partial^2 g_k}{\partial \delta\alpha \partial \delta\beta},\ C_{\delta\beta B} = \frac{\partial^2 g_k}{\partial \delta\beta \partial B},$$

$$C_{\delta\beta K} = \frac{\partial^2 g_k}{\partial \delta\beta \partial K},\ C_{\delta\beta\delta\alpha} = \frac{\partial^2 g_k}{\partial \delta\beta \partial \delta\alpha},\ C_{\delta\beta\delta\beta} = \frac{\partial^2 g_k}{\partial \delta\beta \partial \delta\beta}$$

Based on the Jacobi matrix and the Hessian matrix, the Kalman filtering process is completed based on the two-order Taylor expansion, and the zero deflection, scale factor error and installation error of each gyroscope can be estimated.

$$\hat{X}_{k|k-1} = I_{16 \times 16} \hat{X}_{k-1}$$

$$P_{k|k-1} = P_{k-1}$$

$$K_k = P_{k|k-1} J_k^T \left( J_k P_{k|k-1} J_k^T \right) + \frac{1}{2} \sum_{i,j} C_{ij} P_{k|k-1}^2 C_{ij}^T + R_k \right)^{-1}$$

$$\hat{X}_k = \hat{X}_{k|k-1} + K_k (Z_k - H_k \hat{X}_{k|k-1})$$

$$P_k = (I - K_k H_k) P_{k|k-1}$$

Therefore, the experimental calibration process of the inertial measurement unit is completed. Then, the estimated zero deflection, scale factor and installation error are brought into the gyroscope, and the angular speed output can be obtained accurately.

The simulation schemes, conditions and outcomes using the MATLAB software are shown as follows.

(1) Configuration of Sample Point 4000 sample points are simulated, and the sampling frequency is 100 Hz.

(2) Configuration of Movement of Turntable

Figure 3:
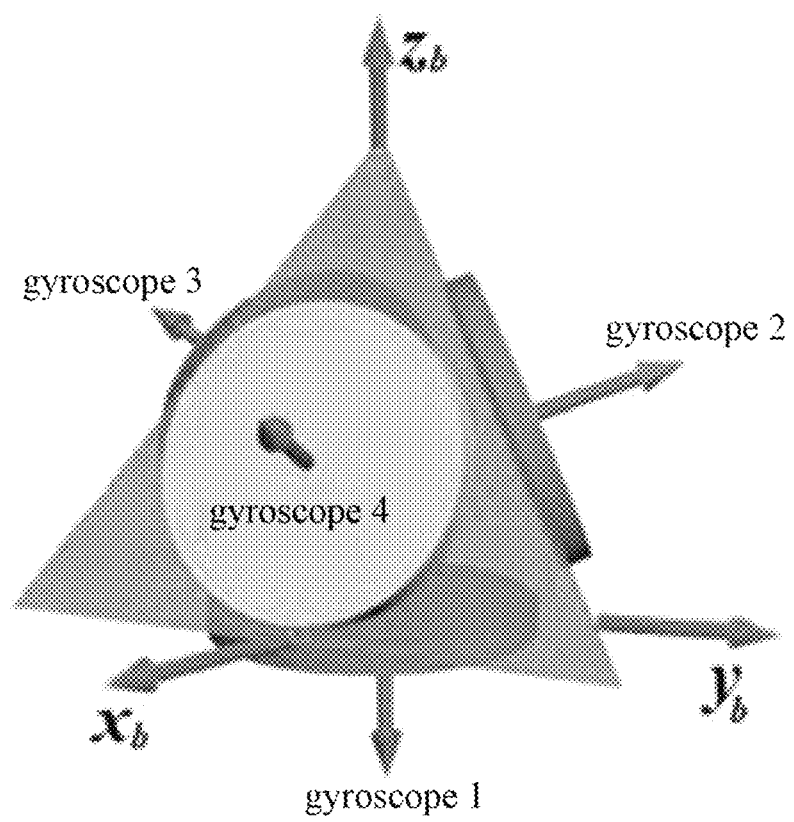
FIG. 3 is a tetrahedron redundant configuration scheme of four gyroscopes.
Figure 4:
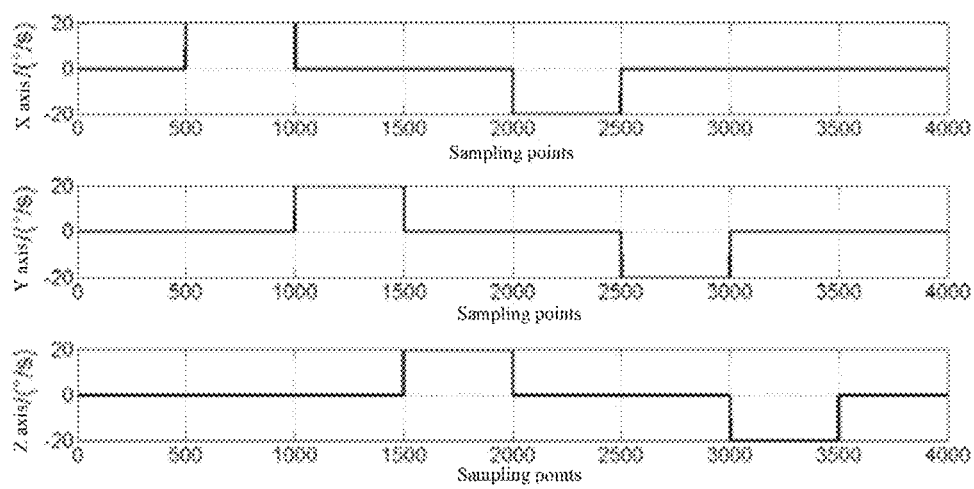
FIG. 4 is the curves simulating the triaxial angular movement of the carrier on the turntable.
Figure 5A:
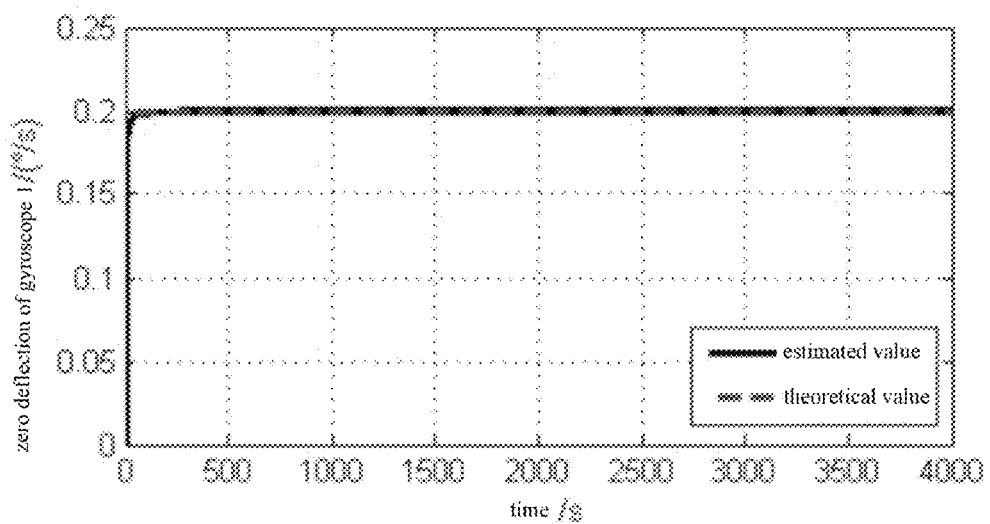
FIGS. 5a-5d show the estimating curves of the zero deflection of the four gyroscopes, respectively.
Figure 5B:
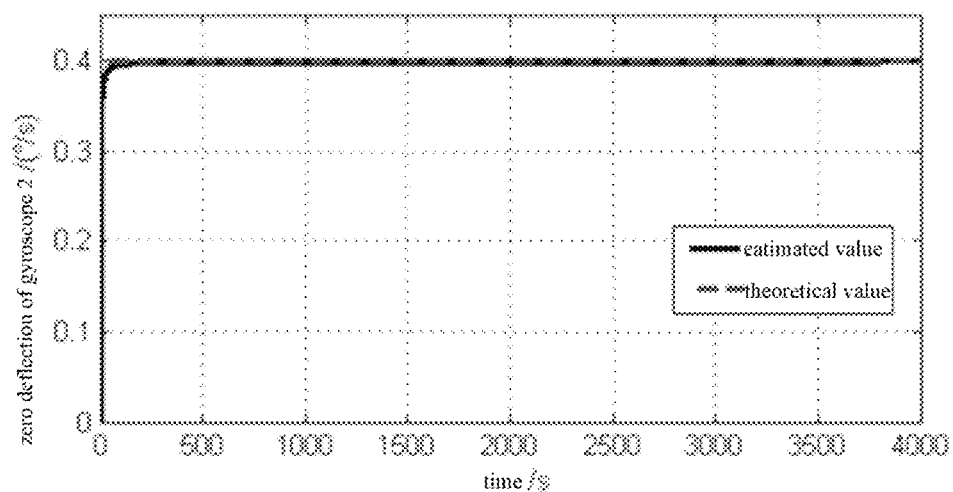
Figure 5C:
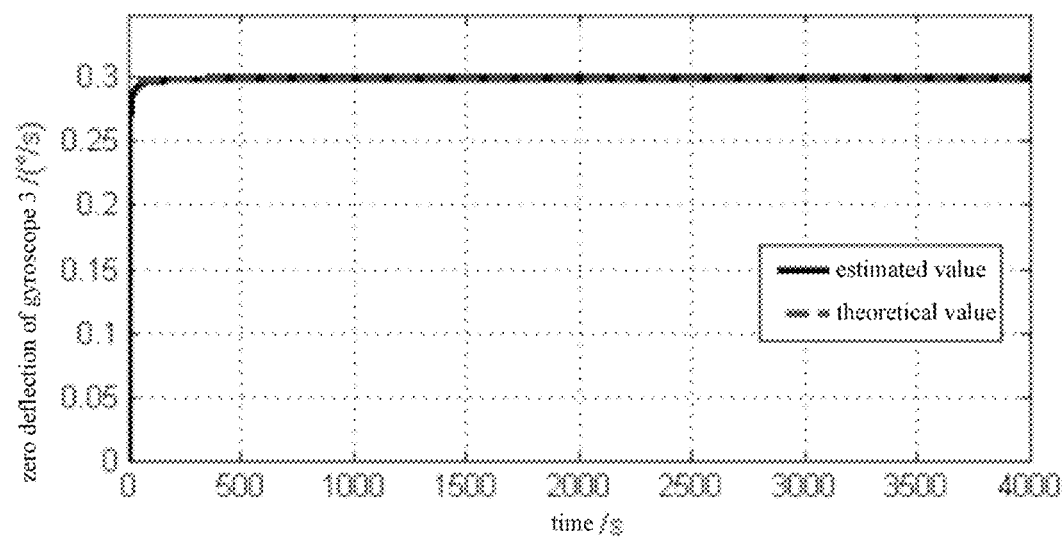
Figure 5D:
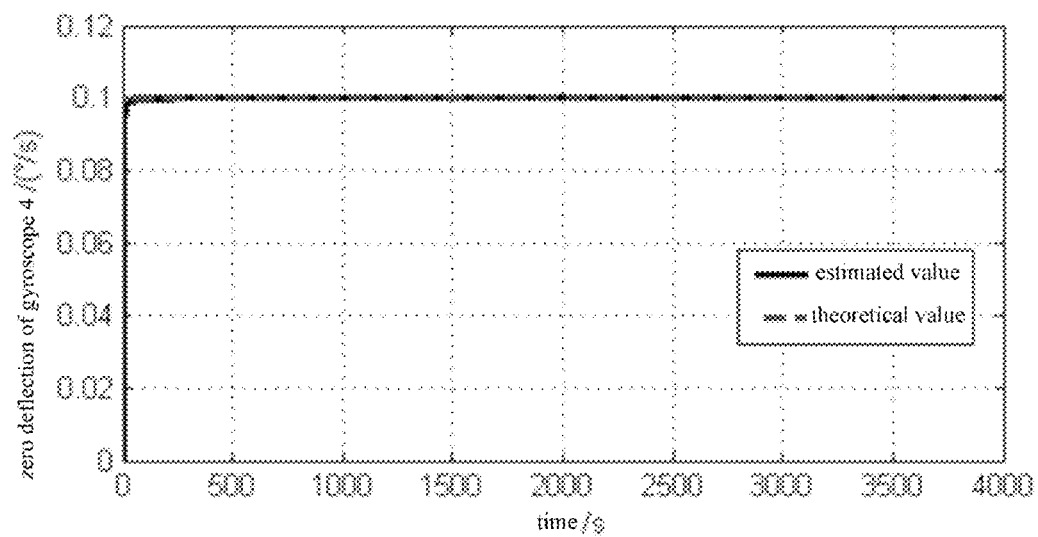
Figure 6A:
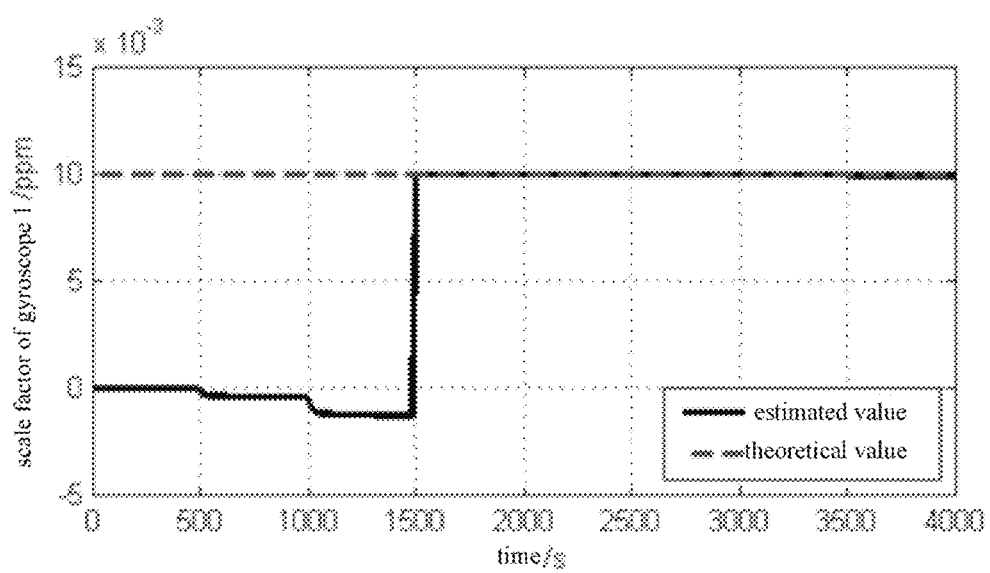
FIGS. 6a-6d show the estimating curves of the scale factor error of the four gyroscopes, respectively.
Figure 6B:
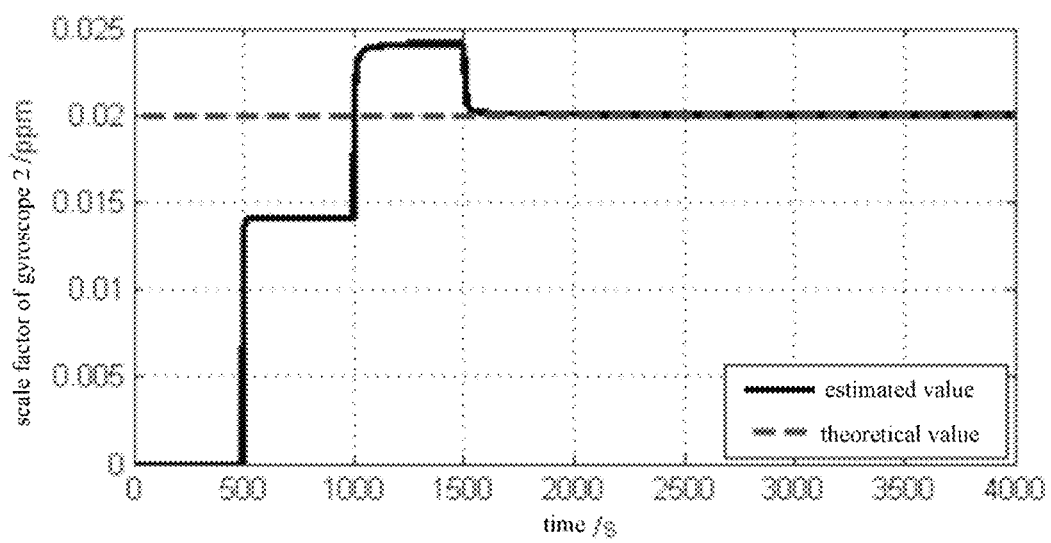
Figure 6C:
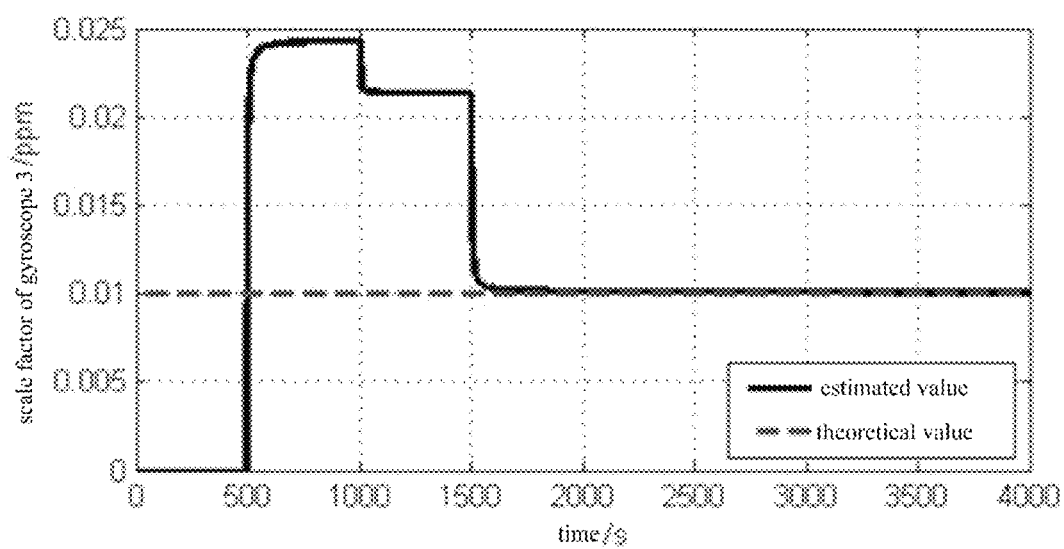
Figure 6D:
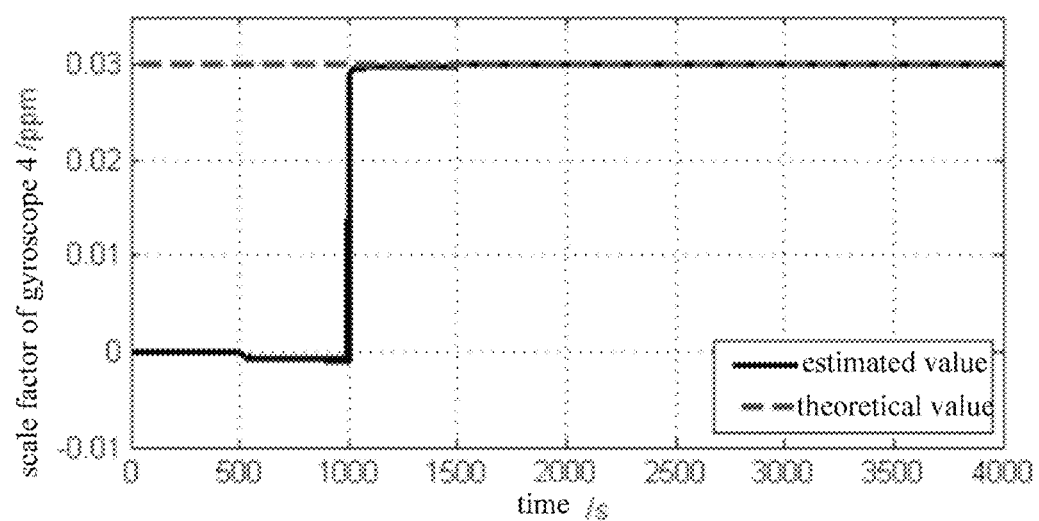
Figure 7A:
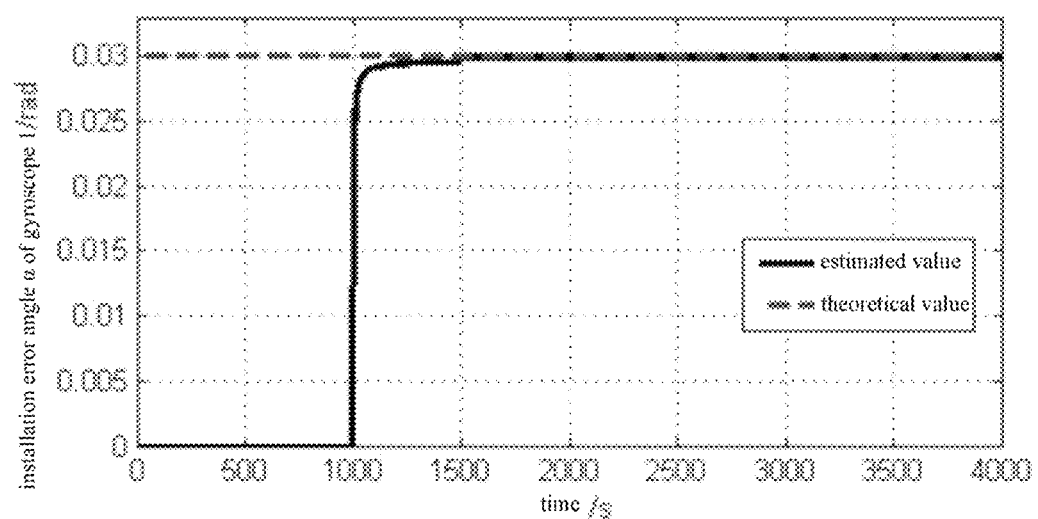
FIGS. 7a-7d show the estimating curves of the installation angle α of the four gyroscopes, respectively.
Figure 7B:
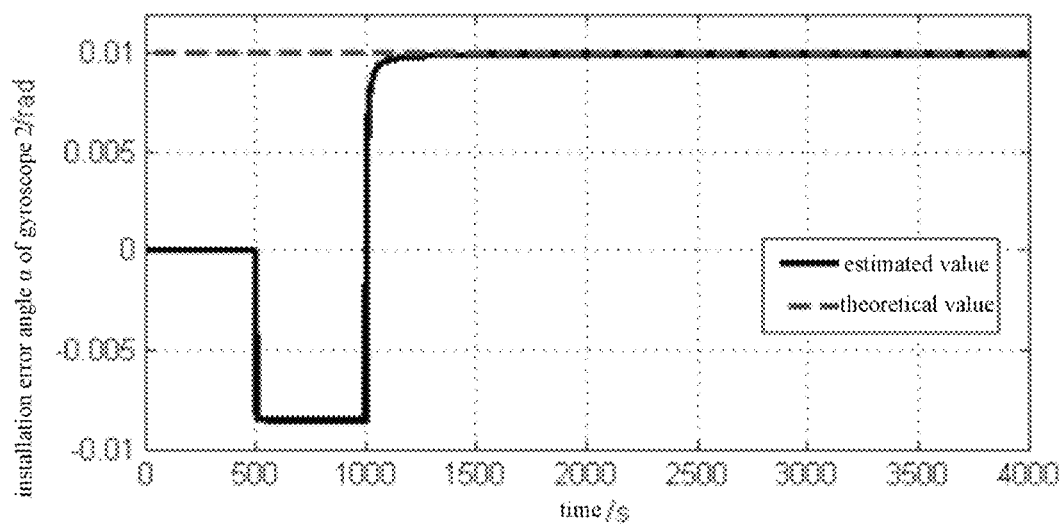
Figure 7C:
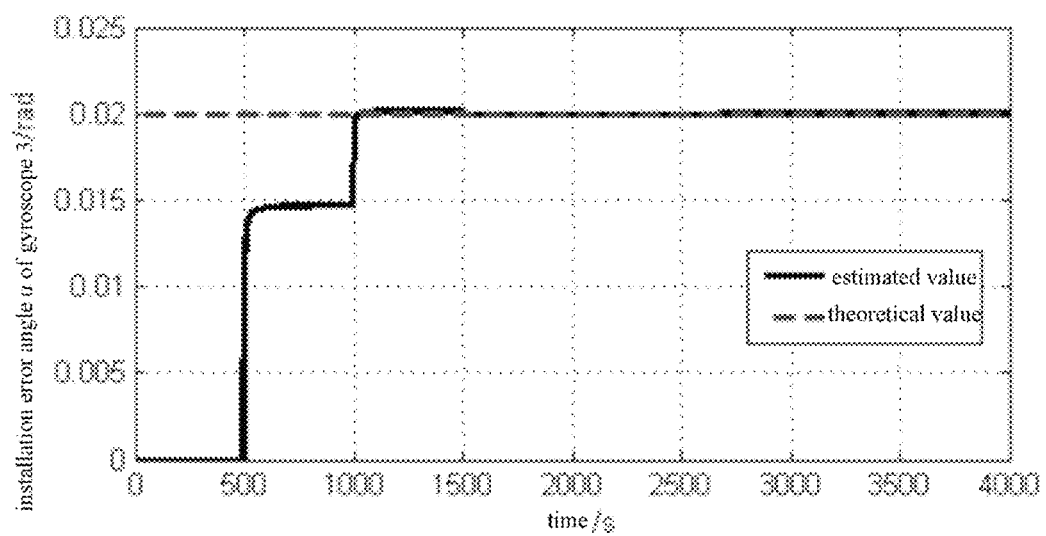
Figure 7D:
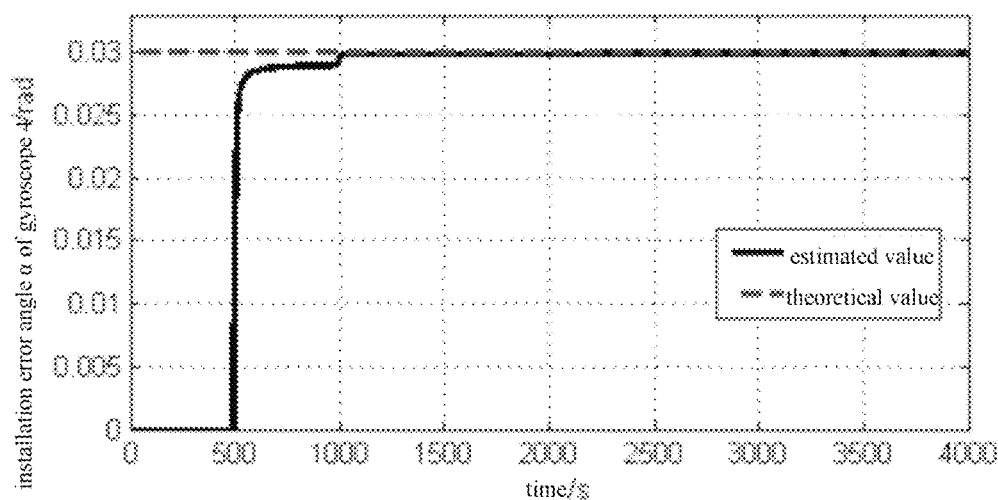
Figure 8A:
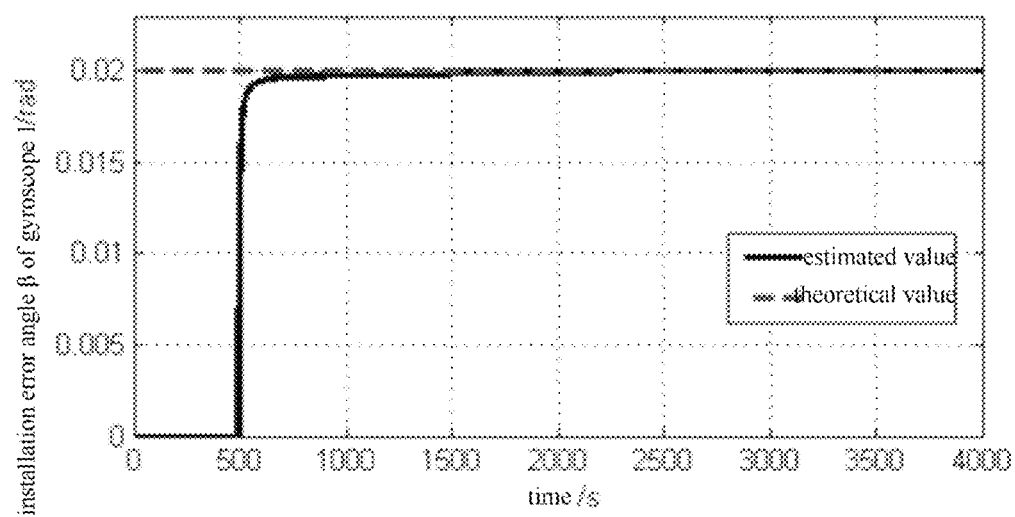
FIGS. 8a-8d show the estimating curves of the installation angle β of the four gyroscopes, respectively.
Figure 8B:
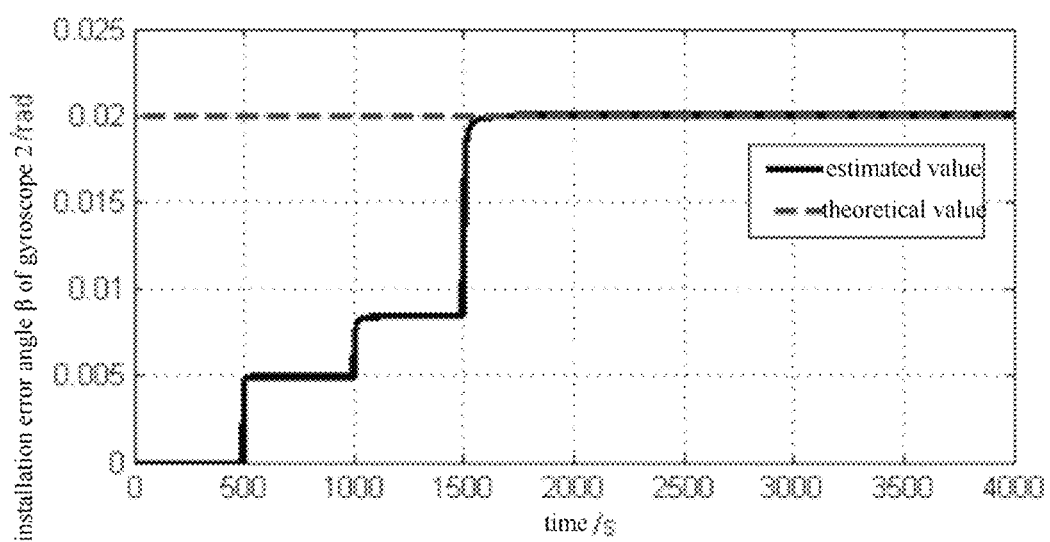
Figure 8C:
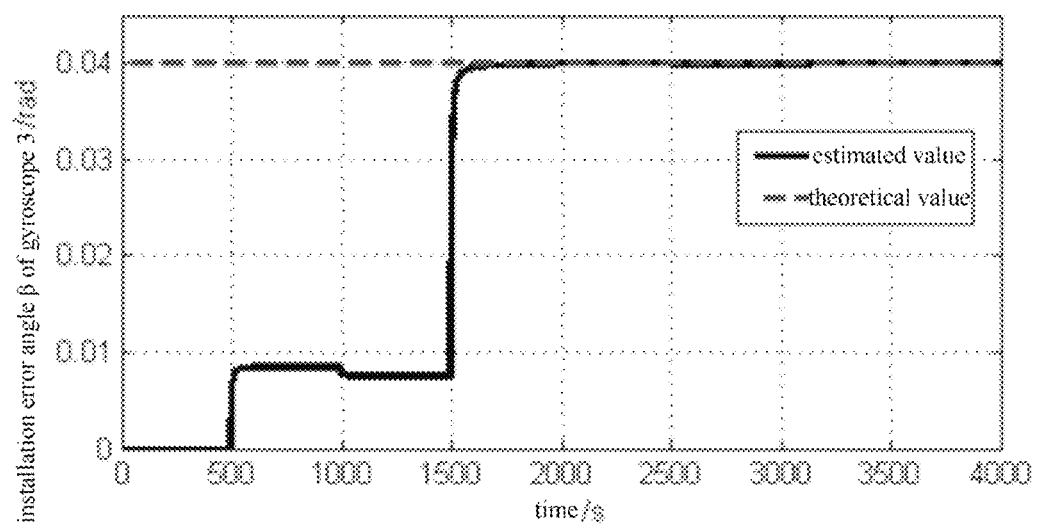
Figure 8D:
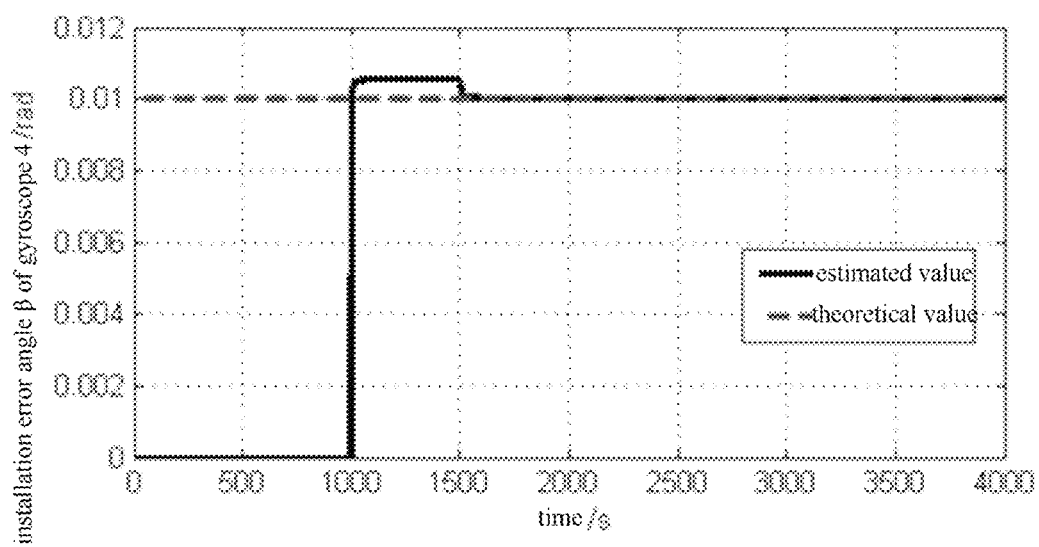

The curves simulating the triaxial angular movement of the carrier on the turntable are shown in FIG. 3.

(3) Configuration of Zero Deflection, Scale Factor Error and Installation Error of Gyroscope The zero deflection of gyroscopes 1-4 are configured respectively as $b_1=0.2°/s$, $b_2=0.4°/s$, $b_3=0.3°/s$, $b_4=0.1°/s$. The scale factor of the gyroscopes 1-4 are configured respectively as $k_1=0.01$ ppm, $k_2=0.02$ ppm, $k_3=0.01$ ppm, $k_4=0.03$ ppm. The installation errors of the gyroscopes 1-4 are configured respectively as $\delta\alpha_1=0.03$ rad, $\delta\alpha_2=0.01$ rad, $\delta\alpha_3=0.02$ rad, $\delta\alpha_4=0.03$ rad. The installation errors of the gyroscopes 1-4 are configured respectively as $\delta\beta_1=0.02$ rad, $\delta\beta_2=0.02$ rad, $\delta\beta_3=0.04$ rad, $\delta\beta_4=0.01$ rad.

(4) Simulation Outcome

According to the simulation condition, FIGS. 8a-8d, 5a-5d, 6a~6d and 7a~7d show the simulation demonstration of the experimental calibration method of the redundant inertial measurement unit designed in the disclosure.

Incorporating the analysis mentioned above, the analysis results are as follows. The experimental calibration method of the redundant inertial measurement unit proposed by the disclosure, the zero deflection, the scale factor and the installation error can be estimated accurately, and the accuracy of the inertial measurement unit can be improved. Therefore, the disclosure can promote the performance of the navigation system and ensure the precision of navigation system.

The present disclosure discloses an experimental calibration method of a redundant inertial measurement unit. The method presents the cone descriptive scheme of the installation angle error. Based on the cone descriptive scheme, the installation error model of the inertial measurement unit can be established. After bringing the zero deflection and scale factor into the installation error model, the universal calibration model of the redundant inertial measurement unit can be derived. The state equation and measurement equation of the filter can be established based on the calibration model. The observability of the measurement equation can be increased by the zero space amplification. Finally, the zero deflection, scale factor error and installation error can be estimated by extended Kalman filtering algorithm based on the two-order Taylor expansion. The method can provide a high estimated accuracy, a strong universality, and a simple experimentation process. In addition, the method can estimate the zero deflection, the scale factor error and installation error at the same time, and can improve the accuracy of the inertial measurement unit.

Figure 9:
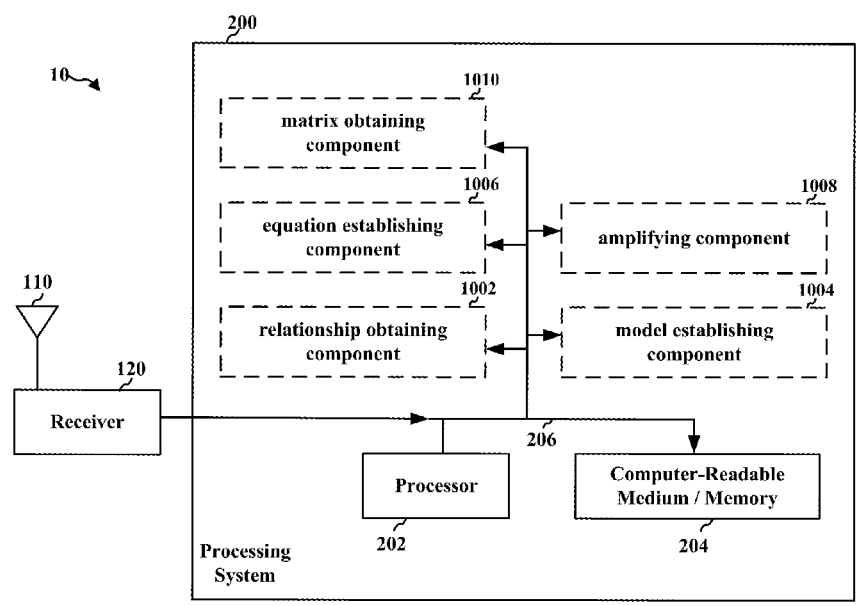
FIG. 9 shows an experimental calibration apparatus of a redundant inertial measurement unit of the present disclosure.

FIG. 9 shows an exemplary an experimental calibration apparatus of a redundant intertial measurement unit. The apparatus 10 may include a receiver 20, and a processing system 200.

The apparatus may include additional components that perform each of the blocks of the algorithm in the aforementioned flow chart of FIG. 1. As such, each block in the aforementioned flowchart of FIG. 1 may be performed by a component and the apparatus may include one or more of those components. The components may be one or more hardware components specifically configured to perform the stated processes/algorithm, implemented by a processor configured to perform the state processes/algorithm, stored within a computer-readable medium for implementation by a processors, or some combination thereof.

The processing system 200 may be implemented with a bus architecture, represented generally by the bus 206. The bus 206 may include any number of interconnecting buses and bridges depending on the specific application of the processing system 200 and the overall design constraints. The bus 206 links together with various circuits including one or more processors and/or hardware components, represented by the processor 202, the components 1002, 1004, 1006, 1008, 1010, and the computer-readable medium/memory 204. The bus 206 may also link various other circuits such as timing sources, peripherals, voltage regulators, and power management circuits, which are well known in the art, and therefore, will not be described any further.

The processing system 200 may be coupled to a receiver 120. The receiver 120 is coupled to one or more antennas 110. The receiver 120 provides a means for communicating with various other apparatus over a transmission medium. The receiver 120 receives a signal from the one or more antennas 100, extracts information from the received signal, and provides the extracted information from the processing system 200. In addition, the receiver 120 receives information from the processing system 200. The processing system 200 includes a processor 202 coupled to a computer-readable medium/memory 204. The processor 202 is responsible for general processing, including the execution of software stored on the computer-readable medium/memory 204. The software, when executed by the processor 202, causes the processing system 200 to perform the various functions described supra for any particular apparatus. The computer-readable medium/memory 204 may also be used for storing data that is manipulated by the processor 202 when executing software. The processing system 200 further includes at least one of the components 1002, 1004, 1006, 1008, 1010. The components may be software components running in the processor 202, resident/stored in the computer readable medium/memory 204, one or more hardware components coupled to the processor 202, or some combination thereof.

Specifically, the processing system 200 includes a relationship obtaining component 1002, a model establishing component 1004, an equation establishing component 1006, an amplifying component 1008, and a matrix obtaining component 1010.

The relationship obtaining component may obtain a relationship of an angular speed of a carrier and an angular speed measured by each gyroscope, based on an installation angle model established using a cone descriptive scheme.

The model establishing component may establish a standard calibration model of the redundant inertial measurement unit based on a relationship between a sensor coordinate system and a carrier coordinate system.

The equation establishing component may establish a state equation and a measurement equation of a filter.

The amplifying component may perform a row amplification of measurement amounts based on the measurement equation, and obtain an amplificated measurement equation for improving observability.

The matrix obtaining component may obtain Jacobi matrix and a Hessian matrix based on the amplificated equation, and estimate error parameters by an extended Kalman filtering algorithm based on a second-order Taylor expansion, to obtain a precise zero deflection, scale factor error and installation error of sensors.

From the foregoing, it will be appreciate that, although specific embodiments of the invention have been described herein for the purposes of illustration, various modifications may be made without deviating from the spirit and scope of the invention. Accordingly, I claim all steps and modifications as may come within the scope and spirit of the following claims.

What is claimed is:

1. An experimental calibration method of a redundant inertial measurement unit comprising,
    step (1), establishing an installation angle model using a cone descriptive scheme, and obtaining a relationship of an angular speed of a carrier and an angular speed measured by one or more gyroscopes,
    step (2), establishing a standard calibration model of the redundant inertial measurement unit based on a relationship between a sensor coordinate system and a carrier coordinate system,
    step (3), establishing, using at least the installation angle, the relationship of an angular speed of a carrier and an angular speed measured by one or more gyroscopes, and an output of the standard calibration model, a state equation and a measurement equation of a filter,
    step (4), performing a row amplification of measurement amounts based on the measurement equation established in step (3) via an amplified measurement equation for improving observability, and
    step (5), obtaining a Jacobi matrix and a Hessian matrix based on the amplified measurement equation, and estimating error parameters by an extended Kalman filtering algorithm based on a second-order Taylor expansion, to obtain a precise zero deflection, scale factor error and installation error of the one or more gyroscopes.

2. The experimental calibration method of claim 1, wherein the step (1) comprises,
    using an intersection angle between a sensitive axis of a gyroscope of the one or more gyroscopes and a Z axis of the carrier coordinate system as a first installation angle $\alpha$, using an intersection angle between a projection of the sensitive axis on a xoy plane of the carrier coordinate system and an X axis of the carrier coordinate system as a second installation angle $\beta$ and
    establishing the relationship between the angular speed of the carrier and the angular speed measured by each gyroscope of the one or more gyroscopes based on a relationship between the carrier coordinate system and the sensitive axis of the gyroscopes, $$\begin{bmatrix} \omega_{g1} \\ \dots \\ \omega_{gn} \end{bmatrix} = \begin{bmatrix} \sin\alpha_1\cos\beta_1 & \sin\alpha_1\sin\beta_1 & \cos\alpha_1 \\ \dots & \dots & \dots \\ \sin\alpha_n\cos\beta_n & \sin\alpha_n\sin\beta_n & \cos\alpha_n \end{bmatrix} \cdot \begin{bmatrix} \omega_{bx} \\ \omega_{by} \\ \omega_{bz} \end{bmatrix},$$

where $\omega_{gn}$ is the angular speed outputted by the $n^{th}$ gyroscope, and $w_{bx}$, $\omega_{by}$, $\omega_{bz}$ are the angular speed in the carrier coordinate system.

3. The experimental calibration method of claim 2, wherein the standard calibration model of the redundant inertial measurement unit is, $$\omega_{gn} = (1-k_n)\left(w_n\begin{bmatrix}\omega_{bx}\\\omega_{by}\\\omega_{bz}\end{bmatrix} - \delta\beta_n u_n\begin{bmatrix}\omega_{bx}\\\omega_{by}\\\omega_{bz}\end{bmatrix} - \delta\alpha_n v_n\begin{bmatrix}\omega_{bx}\\\omega_{by}\\\omega_{bz}\end{bmatrix}\right) - b_n$$

where $b_n$ is the zero deflection of the $n^{th}$ sensor, $k_n$ is the scale factor error of the $n^{th}$ sensor, $\delta\alpha_n$ is the error of the first installation angle $\alpha$ of the $n^{th}$ sensor, $\delta\beta_n$ is the error of the second installation angle $\beta$ of the $n^{th}$ sensor, and $w_n$, $u_n$ and $v_n$ are installation relationship matrixes of the sensors in the carrier coordinate system,
    the installation relationship matrixes of the sensors in the carrier coordinate system are expressed as, $w_n = [\cos \beta_n \sin \alpha_n \sin \beta_n \sin \alpha_n \cos \alpha_n]$ $u_n = [\cos \beta_n \sin(\alpha_n + 90°)\sin \beta_n \sin(\alpha_n + 90°)\cos(\alpha_n + 90°)]$ $v_n = [\cos(\beta_n + 90°)\sin(\beta_n + 90°) 0]$.

4. The experimental calibration method of claim 3, wherein, the state equation is expressed as $X_{k+1} = X_k$, where $X = [b_1 \dots b_n\ k_1 \dots k_n\ \delta\alpha_1 \dots \delta\alpha_n\ \delta\beta_{n1} \dots \delta\beta_n]^T$ and X is the state amounts of the filter.

5. An experimental calibration apparatus of a redundant inertial measurement unit, comprising,
    a relationship obtaining component for obtaining a relationship of an angular speed of a carrier and an angular speed measured by one or more gyroscopes, based on an installation angle model established using a cone descriptive scheme, a model establishing component for establishing a standard calibration model of the redundant inertial measurement unit based on a relationship between a sensor coordinate system and a carrier coordinate system, an equation establishing component for establishing, using at least the installation angle, the relationship of an angular speed of a carrier and an angular speed measured by one or more gyroscopes, and an output of the standard calibration model, a state equation and a measurement equation of a filter, an amplifying component for performing a row amplification of measurement amounts based on the measurement equation via an amplified measurement equation for improving observability, and a matrix obtaining component for obtaining a Jacobi matrix and a Hessian matrix based on the amplified measurement equation, and estimating error parameters by an extended Kalman filtering algorithm based on a second-order Taylor expansion, to obtain a precise zero deflection, scale factor error and installation error of the one or more gyroscopes.

\* \* \* \* \*